United States Patent
Watanabe et al.

(10) Patent No.: US 6,306,788 B1
(45) Date of Patent: Oct. 23, 2001

(54) TRANSLUCENT ALUMINA SINTERED BODY AND PRODUCTION THEREOF

(75) Inventors: Hisashi Watanabe; Yoshio Uchida, both of Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/492,194

(22) Filed: Jan. 27, 2000

(30) Foreign Application Priority Data

Jan. 29, 1999 (JP) .................................................. 11-022352

(51) Int. Cl.⁷ ...................................................... C04B 35/10
(52) U.S. Cl. ........................... 501/153; 501/127; 264/674; 313/636
(58) Field of Search .................................... 501/127, 153; 264/674; 313/636

(56) References Cited

U.S. PATENT DOCUMENTS 4,799,601   1/1989   Shimai et al. ...................... 220/21 R

FOREIGN PATENT DOCUMENTS

| | | |
|---|---|---|
| 0 567 095 A1 | 10/1993 | (EP) . |
| 49-15447 | 4/1974 | (JP) . |
| 54-148008 | 11/1979 | (JP) . |
| 6-191833 | 7/1994 | (JP) . |
| 6-191836 | 7/1994 | (JP) . |

*Primary Examiner*—C. Melissa Koslow
(74) *Attorney, Agent, or Firm*—Sughrue, Mion, Zinn, Macpeak & Seas, PLLC

(57) ABSTRACT

A method for producing a translucent alumina sintered body comprising the steps of:

forming a raw material powder, and sintering the formed product under the condition of hydrogen atmosphere from atmospheric pressure to vacuum at a temperature of from 1600 to 1900° C., wherein the raw material powder is a mixed powder comprising an α-alumina powder (1) which comprises a polyhedral primary particle having substantially no fractured surface, has a BET specific surface area of 1 to 7 m²/g, and has a purity of 99.99% or more, an alumina powder (2) having a BET specific surface area of 5 to 200 m²/g in an amount of 10% by weight or less based on said α-alumina powder, and a sintering agent, and satisfies the following formula:

(BET specific surface area of alumina powder (2))–(BET specific surface area of α-alumina powder (1))>2 m²/g.

16 Claims, No Drawings

TRANSLUCENT ALUMINA SINTERED BODY AND PRODUCTION THEREOF

FIELD OF THE INVENTION

The present invention relates to a translucent alumina sintered body having high linear transmittance and a method for producing the same.

DESCRIPTION OF THE RELATED ART

In conventional high purity alumina powders, fine particles coagulate each other or coarse particles are present heterogeneously, therefore, sintering speed is non-uniform and coarse pores remain in large number. A coarse pore having a size of several $\mu$m or more is difficult to be removed only by optimization of a sintering agent, and also there is a limitation on linear transmittance of the final sintered body.

For obtaining high translucency, there is known a technique in which, for example, ruthenium oxide, lanthanum oxide and the like are added in addition to magnesium oxide, and refractive index of spinel phase on grain boundary is allowed to approximate that of alumina to improve translucency (Japanese Patent Application Publication (JP-B) No. 49-15447). However, this method has been problems that uniform dispersion of trace components heavier than aluminum oxide is difficult, consequently, microstructure of sintered body easily becomes non-uniform, and whole light transmittance lowers due to absorption of lights by these trance components.

Also, there is known a technique in which calcium oxide having an effect for promoting grain growth of alumina is added in addition to magnesium oxide, and sintered body system is enlarged to increase translucency. However, there has been a problem that mechanical strength decreases by enlargement of the system (JP-B No. 54-148008).

SUMMARY OF THE INVENTION

The present inventors have intensively studied to solve the above-described problems, and found that a translucent alumina sintered body having higher translucency than that of conventional one while maintaining the same structure of sintered body as that of the conventional one can be obtained by adding alumina which has a BET specific surface area of 5 to 200 m$^2$/g and a sintering agent to an $\alpha$-alumina powder comprising a polyhedral primary particle having substantially no fractured surface, forming the mixture and sintering the formed product under the condition of hydrogen atmosphere from atmospheric pressure to vacuum at a temperature from 1600 to 1900° C.

That is, the present invention provides a method for producing a translucent alumina sintered body comprising the steps of:

forming a raw material powder, and sintering the formed product under the condition of hydrogen atmosphere from atmospheric pressure to vacuum at a temperature from 1600 to 1900° C., wherein the raw material powder is a mixed powder comprising an $\alpha$-alumina powder (1) which comprises a polyhedral primary particle having substantially no fractured surface, has a BET specific surface area of 1 to 7 m$^2$/g, and has a purity of 99.99% or more, an alumina powder (2) having a BET specific surface area of 5 to 200 m$^2$/g in an amount of 10% by weight or less based on said $\alpha$-alumina powder, and a sintering agent, and satisfies the following formula:

(BET specific surface area of alumina powder (2))−(BET specific surface area of $\alpha$-alumina powder (1))>2 m$^2$/g.

Also, the present invention provides a translucent alumina sintered body having an average grain size of 20 to 50 $\mu$m, and having linear transmittance of a light which has a wavelength of 600 nm passing through a plate having a thickness of 0.85 mm is from 50 to 70%.

DETAILED DESCRIPTION OF THE PREFERRED EMBODIMENTS

The present invention will be described in detail below.

In the present invention, a slurry is prepared by mixing a solvent, organic binder, plasticizer and dispersant into a mixed powder obtained by adding an $\alpha$-alumina powder (1) which comprises a polyhedral primary particle having substantially no fractured surface, has a BET specific surface area of 1 to 7 m$^2$/g, and has a purity of 99.99% or more, an alumina powder (2) having a BET specific surface area of 5 to 200 m$^2$/g in an amount of 10% by weight or less (excepting zero), preferably 0.5 to 7% by weight, more preferably 2 to 5% by weight based on the $\alpha$-alumina powder (1), and a sintering agent such as magnesium oxide and the like, and if necessary, a further sintering agent such as zirconium oxide and the like. Then, the resulted slurry is formed, and if necessary, calcined under air at a temperature of from 500 to 1500° C., then, the resulted calcinated product is sintered under the condition of hydrogen atmosphere from atmospheric pressure to vacuum at a temperature from 1600 to 1900° C. to obtain an intended translucent alumina sintered body.

Herein, as the $\alpha$-alumina powder which comprises a polyhedral primary particle having substantially no fractured surface and has a BET specific surface area of 1 to 7 m$^2$/g used as a raw material in the present invention, there is an $\alpha$-alumina powder obtained by calcining transition alumina or a alumina powder which is converted to transition alumina by heat treatment in an atmospheric gas containing hydrogen chloride. This $\alpha$-alumina powder can be produced according to a method for producing an alumina powder having an alumina purity of 99.99% or more and comprising a single crystal particle described in Japanese Patent Application Laid-Open (JP-A) Nos. 6-191833, 6-191836 and the like.

As specific examples of the $\alpha$-alumina powder, Sumicorundum AA03 (primary particle size: 0.3 $\mu$m), AA04 (primary particle size: 0.4 $\mu$m), AA05 (primary particle size: 0.5 $\mu$m), AA07 (primary particle size: 0.7 $\mu$m) and the like manufactured by Sumitomo Chemical Co., Ltd. Purities of all of these alumina powders are 99.99 wt % or more.

The $\alpha$-alumina used in the present invention is a single particle powder in which the primary particle is homogeneous, has no defect inside, has polyhedral form and a D/H ratio of from 0.5 or more to 3.0 or less and the primary particles does not coagulate each other, as well as a purity of the powder of 99.99% or more. When this $\alpha$-alumina is used as a raw material, there can be obtained a formed product in which particle arrangement is uniform and cavity size between particles is uniform due to sharp particle size distribution.

Since the $\alpha$-alumina (1) used in the present invention has excellent dispersibility, the alumina powder (2) having a BET specific surface area of 5 to 200 m$^2$/g can be mixed uniformly to fill the cavity between $\alpha$-alumina particles. Therefore, a number of coarse pores is few in the formed product, the number of pores remaining after sintering is low and the pore size is small leading to high translucency. When a mixed powder of the α-alumina (1) with the alumina (2) is made into a granule, the alumina powder (2) added segregates on the surface of the granule, and by this segregation, segregation of an organic substance such as a binder and the like on the surface of the granule is suppressed. Further, since cavity after degreasing of the formed product is filled with the alumina powder (2), a sintered body in which a number of remaining coarse pores is few and translucency is high can be made.

The α-alumina powder (1) which is the main raw material in the present invention has a BET specific surface area of 1 to 7 m$^2$/g. When the BET specific surface area is less than 1 m$^2$/g, a pore having a diameter of over 0.15 μm is present in the formed product and can not be removed in sintering. Further, a high sintering temperature of 1900° C. or more is necessary for compaction. While, when the BET specific surface area is over 7 m$^2$/g, particles coagulate each other, therefore, particle size distribution becomes broad causing remaining of coarse pores, segregation of a sintering agent such as magnesium oxide and the like, and segregation of the alumina powder (2) having a BET specific surface area of 5 to 200 m$^2$/g, consequently, local grain growth occurs and pores remain. Further, when the purity of the α-alumina powder (1) is less than 99.99%, impurities absorb lights leading to degradation of translucency, or local extraordinary grain growth because of impurities occurs and pores remain.

Oxides or salts of elements other than aluminum contained in the above-described α-alumina powder in an amount of less than 0.01% by weight, or water, organic substances and halogens of less than 1 part by weight which can be removed from a raw material by sintering at 1000° C. or less, do not injure characteristics of the alumina sintered body of the present invention and are permissible.

The α-alumina powder (1) is preferably a powder which comprises an α-alumina particle having a D/H ratio of from 0.5 or more to less than 2.0 when D represents the maximum particle diameter parallel to the hexagonal lattice plane of the α-alumina and H represents the particle diameter perpendicular to the hexagonal close packed lattice plane, which has an average particle size of from 0.01 μm or more to less than 1.0 μm and which has a D90/D10 ratio of 10 or less when D10 and D90 are particle sizes at cumulation diameter of 10% and 90% from smallest particle size side in a cumulative particle size distribution, respectively.

In the present invention, the alumina powder (2) having a BET specific surface area of 5 to 200 m$^2$/g to be added to the α-alumina powder (1) may not necessarily be α-phase. The BET specific surface area of the alumina powder (2) is preferably from 14 to 120 m$^2$/g. As specific examples thereof, TM-DAR (BET specific surface area: 14.4 m$^2$/g) manufactured by Taimei Chemical Co.,Ltd., Al$_2$O$_3$-c (BET specific surface area: 110 m$^2$/g) manufactured by DEGUSSA Co.Ltd., and the like can be listed. Examples of the high purity alumina powder (2) may include AKP-30 (BET specific surface area: 6.8 m$^2$/g) manufactured by Sumitomo Chemical Co., Ltd, but are not limited to these examples.

BET specific surface areas of the α-alumina powder (1) and the alumina powder (2) satisfy the following formula.

(BET specific surface area of alumina powder (2))−(BET specific surface area of α-alumina powder (1))>2 m$^2$/g.

Preferably, BET specific surface areas of the α-alumina powder (1) and the alumina powder (2) satisfy the following formula.

(BET specific surface area of alumina powder (2))≧(BET specific surface area of α-alumina powder (1))×2

Further preferably, BET specific surface areas of the α-alumina powder (1) and the alumina powder (2) satisfy the following formula.

(BET specific surface area of alumina powder (2))≧(BET specific surface area of α-alumina powder (1))×3

As a sintering agent, magnesium compounds may be listed. In addition to magnesium compounds, at least one compound selected from compounds of metal elements, III A and IV A in the periodic table of element may be further mixed. As these compounds, oxides, nitrates, acetates, hydroxides, chlorides and the like are listed, but is not limited to them. A compound which is converted to an oxide at a temperature of 1200° C. or less in sintering under air is also available. As a metal element, scandium, yttrium, zirconium, hafnium, lanthanum and the like are specifically listed in addition to magnesium.

As a sintering agent, preferably magnesium compounds may be used. In addition to magnesium compounds, mixtures of magnesium compounds with at least one compound selected from the group consisting of compounds of metal elements of Group III A and IV A in the IUPAC Periodic table of the elements may be used as a sintering agent. Preferable examples of these compounds include oxides, nitrates, acetates, hydroxides, chlorides and the like, but are not limited to them. A compound which is converted to an oxide at a temperature of 1200° C. or less in sintering under air may also be used. Preferable metal elements are scandium, yttrium, zirconium, hafnium, and lanthanum, in addition to magnesium. As a sintering agent, a magnesium compound or a mixture of a magnesium compound and zirconium compound are preferable, more preferably magnesium oxide or a mixture of magnesium oxide and zirconium oxide. These are converted to oxides in sintering under air and exert the effect as the sintering agent. Generally, sintering agents are added in a total amount of from 10 ppm or more to 1000 ppm or less, preferably from 10 ppm or more to less than 300 ppm in terms of the oxides thereof based on the total alumina powder amount (total amount of the α-alumina powder (1) and the alumina powder (2)). Preferably, the amount of the magnesium compound is from 10 ppm or more to less than 300 ppm in terms of the oxide thereof based on the alumina total amount, and the amount of the at least one compound selected from the group consisting of metal compounds of IIIA and IVA metal elements is 1000 ppm or less in terms of the oxide thereof based on the alumina total amount. Further, a sintered body having high purity, for example, a purity of 99.99 wt % or more is necessary depending on use, a sintering agent is added to the alumina powder preferably in an amount of from 10 to 100 ppm, more preferably of from 10 to 50 ppm.

As magnesium to be added as a sintering agent, any one of magnesium source which is converted to an oxide in hydrolysis or sintering can be used, and magnesium nitrate can be listed as the most suitable one. Likewise, as a zirconium to be added as a sintering agent, any one of zirconium source which is converted to an oxide in hydrolysis or sintering can be used, and zirconium oxychloride can be listed as the most suitable one.

Examples of an organic binder which can be used include polyvinyl alcohol, polyvinyl acetal, various acrylic polymers, methylcellulose, polyvinyl acetate, polyvinyl butyrals, various wax, and various polysaccharides, but are not limited to these compounds.

A solvent differs depending on the kind of a binder used and the forming method thereof, and water is mainly used in the case of a polyvinyl alcohol used in producing a granule by a spray dryer. Depending on prescription, various organic solvents can also be used.

As a dispersant, ammonium polyacrylates (for example, trade name: SN-D5468, manufactured by Sannopco K.K.) are mainly used when the solvent is water. In the case of an organic solvent, ethyl oleate, sorbitan monooleate, sorbitan trioleate, polycarboxylic acid-based compound dispersants and the like may be used. Particularly, for an alumina raw material powder which is used as a raw material in the present invention, polyester-based compounds (trade name; Texahol 3012, manufactured by Sannopco K.K.) are preferable. However, the present invention is not limited to these compounds. Depending on the organic binder used, a slurry having lower viscosity can be produced by using no dispersing agent.

As a plasticizer, ethylene glycol, diethylene glycol, polyethylene glycol, glycerine, polyglycerine, various esters and the like can be used depending on the organic binder used. Examples of suitable organic solvents are dibutyl phthalate, diethylhexyl phthalate and the like. However, the present invention is not limited to these compounds.

In the present invention, a releasing agent, coagulating agent and pH regulator can also be added as other additives, however, in this case, it is important that no inorganic impurity other than aluminum is present in solvents and additives.

Next, the production method of a slurry and forming method will be described. That is, first, the above-described alumina raw material powder, a solvent and a dispersant are compounded in suitable amounts, and subjected to mechanical stirring and mixing. In this procedure, mixing by a ball mill is usually conducted widely. However, since the alumina powder which is used as a raw material in the present invention is a powder in which particle form and particle size are uniform and coagulation seldom occurs, it is preferable that they are easily dispersed in a solvent to be a uniform slurry by irradiating an ultrasonic wave from outside using an ultrasonic wave chamber or irradiating an ultrasonic wave from an ultrasonic homogenizer. A dispersing method using no medium such as a ceramic ball and the like is preferable from the standpoint of prevention of mixing of oxides or salts of a substance other than aluminum oxide. When the chamber volume is 40 liter, it is desirable that the ultrasonic has an irradiation ability of 10 kHz or more, preferably 25 kHz or more. Though the stirring and mixing time differs depending on the volume of the slurry, when the slurry amount is 10 liter, for example, it is preferable that stirring and mixing is conducted for 30 minutes or more. Thus, a raw material powder is fully dispersed, then, an organic binder is mixed. When the slurry amount is, for example, 10 liter, this mixing is desirably conducted for 1 hour or more.

A slurry prepared as described above may be defoamed under reduced pressure. Further, various defoaming agents may be used. Further, depending on the following forming method, the viscosity may be controlled to 50 to 10000 mPa·s by addition of various pH regulators and coagulating agents. For example, in granulation using a spray dryer, it is preferable to control the viscosity of an alumina slurry to 300 to 400 mPa·s by pH regulation with an aqueous hydrochloric acid solution, ammonia water and the like, to produce a spherical granule. Further, it is also possible to increase alumina concentration in a slurry by stand-still deposition, centrifugal separation, concentration under reduced pressure by a rotary evaporator, and the like.

In the present invention, as a forming method, a conventional method can be used such as a slip casting method, centrifugal casting method, extrusion method and the like, utilizing the above-described slurry. Further, it is also possible that the above-described slurry is made into a granule by spray dry and the like, then, press forming or cold isostatic press (shortly said C.I.P.) forming is conducted.

In the case of the C.I.P. forming, the above-described slurry is made into a granule by spray dry and the like, this granule is subjected to mono-axial press forming under a pressure of preferably from 0.5 to 50 MPa, more preferably from 20 to 30 MPa, then, the formed product is pressed by a C.I.P. machine under a pressure of preferably from 50 to 300 MPa, more preferably from 100 to 150 MPa, and the resulted formed product is processed into a desired shape.

The formed product obtained by the above-described forming method is calcined preferably at a temperature from 500 to 1500° C. for 1 hour or more, more preferably at a temperature from 900 to 1200° C. for 3 hours or more, for degreasing. Then, the calcined product is usually sintered in a reducing atmosphere or vacuum under an atmospheric pressure at a temperature in the range of from 1600 to 1900° C., preferably from 1750 to 1850° C., more preferably from 1780 to 1820° C., to produce an intended translucent alumina sintered body. When the sintering temperature is lower than 1600° C., sufficient compaction may not be obtained, and when the sintering is conducted at a temperature higher than 1900° C., the grain size of the sintered body may enlarge, pores may remain, and the mechanical strength of the sintered body may lower.

The microstructure of the translucent alumina sintered body obtained in the present invention comprises polycrystalline alumina having an average grain size of 20 to 50 $\mu$m, and having linear transmittance of a light which has a wavelength of 600 nm passing through a plate having a thickness of 0.85 mm of from 50 to 70%. The translucent alumina sintered body of the present invention can be produced by a usual method such as, for example, sintering in a hydrogen atmosphere after dry forming and the like, and suitably used as a lamp arc tube, such as an emission tube for a sodium discharge lamp or metal halide lamp, as a semiconductor production apparatus member such as a micro wave irradiation window, dry etching chamber, transporting hand, vacuum chuck and the like, as a temperature measuring window of a high temperature apparatus and the like, as a bioceramic member, such as an artificial tooth for which visual transparent feeling is required, or as an ornament such as a dish, cup and the like.

EXAMPLE

The following examples further illustrate the present invention in detail below, but do not limit the scope of the present invention.

Various measurements in the present invention were conducted as descried below.

(1) Measurement of BET Specific Surface Area

It was measured by Flow Sorb 2300 manufactured by Shimadzu Corp.

(2) Measurement of Liner Transmittance

A circular pellet having a thickness of 0.85 mm of which both sides were mirror-polished using a diamond slurry was set into UV-1200 manufactured by Shimadzu Corp., and the transmittance at a wavelength of 600 nm (slit diameter: 0.55 mm Φ) was measured.

(3) Observation of Sintered Body System of Alumina Translucent Body

The pellet used in the measurement of transmittance was calcined at 1650° C. for 1 hour, and the resulted surface was photographed at a magnification of 50 using an optical microscope (T-300: manufactured by Nikon Corp.). From this photograph, a particle size of the system was measured by a section method.

In comparative examples, AKP-20 (BET specific surface area; 4.2 m$^2$/g) manufactured by Sumitomo Chemical Co., Ltd. was used as an alumina powder having a purity of 99.99% while the powder is a polyhedral form and has a fractured surface.

Example 1

An α-alumina powder (trade name: Sumicorundum AA04) manufactured by Sumitomo Chemical Co., Ltd. was used as α-alumina having substantially no fractured surface. This alumina powder was composed of a polyhedral particle having 8 to 20 surfaces and had a D/H ratio of 1. The BET specific surface area was 3.5 m$^2$/g. The average particle size of this powder by a laser diffraction scattering method was 0.52 μm. 4750 g of the AA04 powder, 3100 g of water (solvent), 6.4 g of magnesium nitrate hexahydrate (reagent grade)(200 ppm in terms of magnesium oxide based on the total alumina powder), 125 g of a dispersant, 40 wt % aqueous solution of ammonium polycarboxylate (trade name: SN-D5468, manufactured by Sannopco K.K.), and 250 g of fine particle alumina having a BET specific surface area of 110 m$^2$/g (trade name: Al$_2$O$_3$-c, manufactured by DEGUSSA Co.Ltd.,) were stirred and mixed for 30 minutes while irradiating an ultrasonic wave. Then, 1000 g of a 10 wt % solution of polyvinyl alcohol (trade name: PVA-205C, manufactured by Kuraray Co., Ltd.) as an organic binder, and 10 g of polyethylene glycol (polymerization degree: 400 is shortly said PEG#400; reagent grade) as a plasticizer were added and stirred and mixed for 60 minutes to prepare a slurry.

This slurry was spray-dried by a spray dryer to produce a granule. This granule was humidified to a moisture content of 0.5 wt %, then, filled in a mold, and formed at a load of 30 MPa by a monoaxial press machine and then at a load of 150 MPa by a C.I.P. to produce a cylindrical formed product having a diameter of 20 mm and a height of 5 mm. Then, this formed product was calcined under air at 900° C. for 3 hours to remove the organic binder, then, sintered in hydrogen (dew point: 0° C.) at a temperature of 1800° C. for 4 hours.

The transmittance of the resulted sintered body was 54%. The average grain size of the sintered body was 36 μm.

Example 2

4900 g of the AA04 powder described in Example 1, 3100 g of water, 6.4 g of magnesium nitrate hexahydrate, 125 g of a dispersant SN-D5468, and 100 g of fine particle alumina having a BET specific surface area of 14.4 m$^2$/g (trade name: TM-DAR, manufactured by Taimei Chemical Co.,Ltd.) were stirred and mixed for 30 minutes while irradiating an ultrasonic wave. Then, 1000 g of a 10 wt % solution of PVA-205C as an organic binder, and 10 g of PEG#400 as a plasticizer were added and stirred and mixed for 60 minutes to prepare a slurry.

This slurry was spray-dried by a spray dryer to produce a granule. This granule was humidified to a moisture content of 0.5 wt %, then, filled in a mold, and formed at a load of 30 MPa by a monoaxial press machine and then at a load of 100 MPa by a C.I.P. to produce a cylindrical formed product having a diameter of 20 mm and a height of 5 mm. Then, this formed product was calcined under air at 900° C. for 3 hours to remove the organic binder, then, sintered in hydrogen at a temperature of 1800° C. for 4 hours.

The transmittance of the resulted sintered body was 52%. The average grain size of the sintered body was 40 μm.

Example 3

4900 g of the AA04 powder described in Example 1, 3100 g of water, 4.8 g of magnesium nitrate hexahydrate, 3.9 g of zirconium oxychloride (300 ppm in terms of zirconium oxide based on the total alumina powder), 125 g of a dispersing agent SN-D5468, and 100 g of fine particle alumina TM-DAR having a BET specific surface area of 14.4 m$^2$/g were stirred and mixed for 30 minutes while irradiating an ultrasonic wave. Then, 1000 g of a 10 wt % solution of PVA-205C as an organic binder, and 10 g of PEG#400 as a plasticizer were added and stirred and mixed for 60 minutes to prepare a slurry.

This slurry was spray-dried by a spray dryer to produce a granule. This granule was used as a raw material, and a cylindrical formed product was made in the same manner as in Example 1, and sintered in hydrogen The transmittance of the resulted sintered body was 63%. The average grain size of the sintered body was 40 μm.

Example 4

An α-alumina powder (trade name: Sumicorundum AA07) manufactured by Sumitomo Chemical Co., Ltd. was used as α-alumina having substantially no fractured surface. This alumina powder was composed of a polyhedral particle having 8 to 20 surfaces and had a D/H ratio of 1. The BET specific surface area was 2.8 m$^2$/g. The average particle size of this powder by a laser diffraction scattering method was 0.78 μm. 4900 g of the AA07 powder, and 100 g of fine particle alumina TM-DAR having a BET specific surface area of 14.4 m$^2$/g were used as raw materials, and a granule was made in the same manner as in Example 2.

This granule was used as a raw material, and a cylindrical formed product was made in the same manner as in Example 1, and sintered in hydrogen.

The transmittance of the resulted sintered body was 55%. The average grain size of the sintered body was 38 μm.

Example 5

4900 g of the AA04 powder described in Example 1, and 100 g of fine particle alumina having a BET specific surface area of 6.8 m$^2$/g (trade name: AKP-30, manufactured by Sumitomo Chemical Co., Ltd.) were used as raw materials, and a granule was made in the same manner as in Example 2. This granule was used as a raw material, and a cylindrical formed product was made in the same manner as in Example 1, and sintered in hydrogen The transmittance of the resulted sintered body was 51%. The average grain size of the sintered body was 35 μm.

Example 6

The cylindrical formed product in Example 3 was calcined under air at a temperature of 900° C. for 3 hours, then, sintered in vacuum (10$^{-2}$ torr) at a temperature of 1800° C. for 4 hours.

The transmittance of the resulted sintered body was 53%. The average grain size of the sintered body was 44 μm.

Example 7

98 g of the AA04 powder described in Example 1, 100 g of ethanol (solvent), 0.096 g of magnesium nitrate hexahydrate (reagent grade)(150 ppm in terms of magnesium oxide based on the total alumina powder), 0.078 g of zirconium oxychloride (300 ppm in terms of zirconium oxide based on the total alumina powder), 2 g of fine particle alumina TM-DAR having a BET specific surface area of 14.4 m$^2$/g were stirred and mixed for 30 minutes while irradiating an ultrasonic wave. Then, ethanol was removed by a rotary evaporator, and the resulted cake was dried by a hot air at 150° C. The dried substance was ground in a mortar to obtain an alumina powder.

This powder was formed at a load of 30 MPa by a hydraulic monoaxial press machine and then at a load of 70 MPa by a C.I.P. to produce a cylindrical formed product having a diameter of 20 mm and a height of 5 mm. Then, this formed product was calcined under air at 900° C. for 3 hours, then, sintered in hydrogen (dew point: 0° C.) at a temperature of 1820° C. for 4 hours.

The transmittance of the resulted sintered body was 65%. The average grain size of the sintered body was 36 μm.

Example 8

An α-alumina powder (trade name: Sumicorundum AA03) manufactured by Sumitomo Chemical Co., Ltd. was used as α-alumina having substantially no fractured surface. This alumina powder was composed of a polyhedral particle having 8 to 20 surfaces and had a D/H ratio of 1. The BET specific surface area was 4.5 m$^2$/g. The average particle size of this powder by a laser diffraction scattering method was 0.45 μm. 4900 g of the AA03 powder, and 100 g of fine particle alumina TM-DAR having a BET specific surface area of 14.4 m$^2$/g were used as raw materials, and a granule was made in the same manneras in Example 3. This granule was used as a raw material, and a cylindrical formed product was made in the same manner as in Example 1. Then, this formed article was calcined at 900° C. for 3 hours in the atmosphere to remove the organic binder, then, sintered in hydrogen (dew point: 0° C.) at a temperature of 1800° C. for 4 hours.

The transmittance of the resulted sintered body was 58%. The average grain size of the sintered body was 40 μm.

Comparative Example 1

5000 g of the AA04 powder described in Example 1, 3100 g of water (solvent), 6.4 g of magnesium nitrate hexahydrate, and 125 g of a dispersing agent SN-D5468 were stirred and mixed for 30 minutes while irradiating an ultrasonic wave. Then, 1000 g of a 10 wt % solution of PVA-205C as an organic binder, and 10 g of PEG#400 as a plasticizer were added and stirred and mixed for 60 minutes to prepare a slurry.

This slurry was spray-dried by a spray drier to produce a granule. This granule was used as a raw material, and a cylindrical molded product was made in the same manner as in Example 1. Then, this formed article was calcined at 900° C. for 3 hours in the atmosphere to remove the organic binder, then, sintered in hydrogen (dew point: 0° C.) at a temperature of 1820° C. for 4 hours.

The transmittance of the resulted sintered body was 42%. The average grain size of the sintered body was 35 μm.

Comparative Example 2

The cylindrical formed product in Comparative Example 1 was calcined under air at a temperature of 900° C. for 3 hours, then, sintered in vacuum (10$^{-2}$ torr) at a temperature of 1800° C. for 4 hours.

The transmittance of the resulted sintered body was 40%. The average grain size of the sintered body was 40 μm.

Comparative Example 3

5000 g of the AA04 powder described in Example 1, 3100 g of water (solvent), 4.8 g of magnesium nitrate hexahydrate, 3.9 g of zirconium oxychloride, and 125 g of a dispersing agent SN-D5468 were stirred and mixed for 30 minutes while irradiating an ultrasonic wave. Then, 1000 g of a 10 wt % solution of PVA-205C as an organic binder, and 10 g of PEG#400 as a plasticizer were added and stirred and mixed for 60 minutes to prepare a slurry.

This slurry was spray-dried by a spray dryer to produce a granule. This granule was used as a raw material, and a cylindrical formed product was made in the same manner as in Example 1, and sintered in hydrogen The transmittance of the resulted sintered body was 45%. The average grain size of the sintered body was 38 μm.

Comparative Example 4

In this Comparative Example 4, an alumina raw material powder (trade name: AKP-20, manufactured by Sumitomo Chemical Co., Ltd.) was used. The primary particle of this alumina powder was an amorphous particle not being in polyhedral form, and D/H ratio was over 2. The BET specific surface area of this particle was 4.2 m$^2$/g. The average particle size of this powder by a laser diffraction scattering method was 0.54 μm.

5000 g of the AKP-20 powder, 3100 g of water, 6.4 g of magnesium nitrate hexahydrate (200 ppm in terms of magnesium oxide based on the total alumina powder), and 250 g of fine particle alumina Al$_2$O$_3$-c having a BET specific surface area of 110 m$^2$/g were stirred and mixed for 30 minutes while irradiating an ultrasonic wave. Then, 1000 g of a 10 wt % solution of PVA-205C as an organic binder, and 10 g of PEG#400 as a plasticizer were added and stirred and mixed for 60 minutes to prepare a slurry.

This slurry was spray-dried by a spray dryer to produce a granule. This granule was humidified to a moisture content of 0.5 wt %, then, filled in a mold, and formed at a load of 70 MPa by a hydraulic monoaxial press machine and then at a load of 150 MPa by a C.I.P.to produce a cylindrical formed product having a diameter of 20 mm and a height of 10 mm. Then, this formed product was calcined under air at 900° C. for 3 hours, then, sintered in hydrogen (dew point: 0° C.) at a temperature of 1820° C. for 4 hours.

The resulted sintered body was opaque and translucency was not obtained. The average grain size of the sintered body was 35 μm. Pores having a size over 1 μm remained in large number in the sintered body. Further, coarse grains having a size over 50 μm were also observed.

Comparative Example 5

5000 g of the AKP-20 powder described in Comparative Example 4, 3100 g of water, 6.4 g of magnesium nitrate hexahydrate, and 100 g of fine particle alumina TM-DAR having a BET specific surface area of 14.4 m$^2$/g were stirred and mixed for 30 minutes while irradiating an ultrasonic wave. Then, the mixture was subjected to ball milling for 3 hours using a plastic ball containing an iron sphere as a medium. Then, further, 1000 g of a 10 wt % solution of PVA-205C as an organic binder, and 10 g of PEG#400 as a plasticizer were added simultaneously, and ball milling was conducted for 3 hours to prepare a slurry.

This slurry was spray-dried by a spray dryer to produce a granule. This granule was made into a cylindrical formed product in the same manner as in Comparative Example 4. Then, this formed product was calcined under air at 1200° C. for 3 hours, then, sintered in hydrogen (dew point: 0° C.) at a temperature of 1820° C. for 4 hours.

The transmittance of the resulted sintered body was 10%. The average grain size of the sintered body was 35 μm.

Comparative Example 6

4900 g of the AKP-20 powder described in Comparative Example 4, 4900 g of water, 4.8 g of magnesium nitrate hexahydrate, 3.9 g of zirconium oxychloride, and 100 g of fine particle alumina TM-DAR having a BET specific surface area of 14.4 m$^2$/g were stirred and mixed for 30 minutes while irradiating an ultrasonic wave. Then, the mixture was subjected to ball milling for 3 hours using a plastic ball containing an iron sphere as a medium. Then, 1000 g of a 10 wt % solution of PVA-205C as an organic binder, and 10 g of PEG#400 as a plasticizer were added simultaneously, and ball milling was conducted for 3 hours to prepare a slurry.

This slurry was spray-dried by a spray drier to produce a granule. This granule was used as a raw material, and a cylindrical formed product was made in the same manner as in Comparative Example 4, and sintered in hydrogen The transmittance of the resulted sintered body was 15%, and the average grain size of the sintered body was 38 μm.

Comparative Example 7

The cylindrical formed product in Comparative Example 6 was calcined under air at a temperature of 900° C. for 3 hours, then, sintered in vacuum (10$^{-2}$ torr) at a temperature of 1800° C. for 4 hours.

The resulted sintered body was opaque and translucency was not obtained. The average grain size of the sintered body was 40 μm. Pores having a size over 1 μm remained in large number in the sintered body. Further, coarse grains having a size over 50 μm were also observed.

Comparative Example 8

4900 g of the AKP-20 powder described in Comparative Example 4, 5000 g of water (solvent), 6.4 g of magnesium nitrate hexahydrate, and 100 g of fine particle alumina having a BET specific surface area of 6.8 m$^2$/g (trade name: AKP-30) were stirred and mixed for 30 minutes while irradiating an ultrasonic wave. Then, the mixture was subjected to ball milling for 3 hours using a plastic ball containing an iron sphere as a medium. Then, further, 1000 g of a 10 wt % solution of PVA-205C as an organic binder, and 10 g of PEG#400 as a plasticizer were added simultaneously, and ball milling was conducted for 3 hours to prepare a slurry.

This slurry was spray-dried by a spray dryer to produce a granule. This granule was made into a cylindrical formed product in the same manner as in Comparative Example 4, and sintered in hydrogen. The transmittance of the resulted sintered body was 10%. The average grain size of the sintered body was 35 μm.

As described above, Examples 1 to 8 and Comparative Examples 1, 2 and 3 show that liner transmittance of the sintered body increases when fine particle alumina is added to an α-alumina powder composed of a polyhedral primary particle having no fractured surface. Examples 1 to 8 and Comparative Examples 4 to 8 show that liner transmittance of the sintered body does not increase, and adversely, tends to decrease when f fine particle alumina is added to an α-alumina powder which is not a polyhedral primary particle and has fractured surface.

The above-described results are summarize in the table below.

TABLE

| | Raw material polyhedral α alumina | | | | Fine particle alumina added | | | | | Sintered body | | | | |
|---|---|---|---|---|---|---|---|---|---|---|---|---|---|---|
| | BET specific surface area (m$^2$/g) | D50 (μm) | D/H | Sintering aid | BET specific surface area (m$^2$/g) | Amount added (wt %) | Dispersion | Processing | Molding pressure kg/cm$^2$ | Sintering Atmosphere | Sintering Temperature (° C.) | Linear transmittance (%) | System average size (μm) | Extraordinary growth |
| Example 1 | 3.5 | 0.52 | 1 | MgO | 110 | 5 | Ultrasonic wave | Granule | 1500 | H$_2$ | 1820 | 54 | 36 | None |
| Example 2 | 3.5 | 0.52 | 1 | MgO | 14.4 | 2 | | Granule | 1000 | H$_2$ | 1800 | 52 | 40 | None |
| Example 3 | 3.5 | 0.52 | 1 | MgO/ZrO2 | 14.4 | 2 | | Granule | 1500 | H$_2$ | 1820 | 63 | 40 | None |
| Example 4 | 2.8 | 0.78 | 1 | MgO | 14.4 | 2 | | Granule | 1500 | H$_2$ | 1820 | 55 | 38 | None |
| Example 5 | 3.5 | 0.52 | 1 | MgO | 6.8 | 2 | | Granule | 1500 | H$_2$ | 1820 | 51 | 35 | None |
| Example 6 | 3.5 | 0.52 | 1 | MgO/ZrO2 | 14.4 | 2 | | Granule | 1500 | Vacuum | 1800 | 53 | 44 | None |
| Example 7 | 3.5 | 0.52 | 1 | MgO/ZrO2 | 14.4 | 2 | | Powder | 700 | H$_2$ | 1820 | 65 | 36 | None |
| Example 8 | 4.5 | 0.46 | 1 | MgO/ZrO2 | 14.4 | 2 | | Granule | 1500 | H$_2$ | 1800 | 58 | 40 | None |
| Comparative example 1 | 3.5 | 0.52 | 1 | MgO | 0 | 0 | Ultrasonic wave | Granule | 1500 | H$_2$ | 1820 | 42 | 35 | None |
| Comparative example 2 | 3.5 | 0.52 | 1 | Mgo | 0 | 0 | | Granule | 1500 | Vacuum | 1800 | 40 | 40 | None |
| Comparative example 3 | 3.5 | 0.52 | 1 | MgO/ZrO2 | 0 | 0 | | Granule | 1500 | H$_2$ | 1820 | 45 | 38 | None |
| Comparative example 4 | 4.2 | 0.54 | >2 | MgO | 110 | 5 | | Granule | 1500 | H$_2$ | 1820 | 0 | 35 | Recognized |
| Comparative example 5 | 4.2 | 0.54 | >2 | MgO | 14.4 | 2 | Ball mill | Granule | 1500 | H$_2$ | 1820 | 10 | 35 | None |
| Comparative example 6 | 4.2 | 0.54 | >2 | MgO/ZrO2 | 14.4 | 2 | | Granule | 1500 | H$_2$ | 1820 | 15 | 38 | None |
| Comparative example 7 | 4.2 | 0.54 | >2 | Mgo/ZrO2 | 14.4 | 2 | | Granule | 1500 | Vacuum | 1800 | 0 | 40 | Recognized |
| Comparative example 8 | 4.2 | 0.54 | >2 | MgO | 6.8 | 2 | | Granule | 1500 | H$_2$ | 1820 | 10 | 35 | None |

What is claimed is:

1. A method for producing a translucent alumina sintered body comprising the steps of:

forming a formed product from a raw material powder, and sintering the formed product in a hydrogen atmosphere of from atmospheric pressure to a vacuum and at a temperature of from 1600 to 1900° C., wherein the raw material powder is a mixed powder comprising an α-alumina powder (1) which comprises a polyhedral primary particle having substantially no fractured surface, has a BET specific surface area of 1 to 7 m$^2$/g, and has a purity of 99.99% or more, an alumina powder (2) having a BET specific surface area of 5 to 200 m$^2$/g in an amount of 10% by weight or less based on said α-alumina powder, and a sintering agent, wherein the α-alumina powder (1) and the alumina powder (2) satisfy the following formula:

(BET specific surface area of the alumina powder (2))−(BET specific surface area of the α-alumina powder (1))>2 m$^2$/g.

2. The method according to claim 1, wherein said sintering agent comprises a magnesium compound.

3. The method according to claim 1, wherein said sintering agent comprises a mixture of a magnesium compound and at least one compound selected from the group consisting of metal compounds of IIIA and IVA metal elements of the IUPAC periodic table of the elements.

4. The method according to claim 2, wherein the amount of the magnesium compound is from 10 ppm or more to less than 300 ppm in terms of the oxide thereof based on the alumina total amount.

5. The method according to claim 3, wherein the amount of the magnesium compound is from 10 ppm or more to less than 300 ppm in terms of the oxide thereof based on the alumina total amount, and the amount of the at least one compound selected from the group consisting of metal compounds of IIIA and IVA metal elements is 1000 ppm or less in terms of the oxide thereof based on the alumina total amount.

6. The method according to claim 1, wherein the amount of the alumina powder (2) is from 0.5 to 7% by weight based on the α-alumina (1).

7. The method according to claim 1, wherein said method further comprises the steps of:

preparing a slurry by mixing the raw material powder with a solvent, selected from the group consisting of water and an organic solvent, an organic binder, a plasticizer, and optionally a dispersing agent, forming the formed product from the slurry, and calcining the formed product in air and at a temperature from 500 to 1500° C., and then performing the sintering step.

8. The method according to claim 1, wherein the α-alumina powder (1) and the alumina powder (2) satisfy the following formula:

(BET specific surface area of the alumina powder (2))≧(BET specific surface area of the α-alumina powder (1))×2.

9. The method according to claim 1, wherein the α-alumina powder (1) and the alumina powder (2) satisfy the following formula:

(BET specific surface area of the alumina powder (2))≧(BET specific surface area of the α-alumina powder (1))×3.

10. The method according to claim 7, wherein the formed product is prepared from the slurry by slip casting, centrifugal casting, extrusion, or by spray drying to form granules and press forming.

11. The method according to claim 10, wherein the press forming is cold isostatic press forming.

12. A translucent alumina sintered body having an average grain size of 20 to 50 μm, and having linear transmittance of light of from 50 to 70%, when light having a wavelength of 600 nm is passed through a plate of the sintered body having a thickness of 0.85 mm.

13. A lamp arc tube made of the translucent alumina sintered body according to claim 12.

14. A semiconductor production apparatus member made of the translucent alumina sintered body according to claim 12.

15. A bioceramic member made of the translucent alumina sintered body according to claim 12.

16. An ornament made of the translucent alumina sintered body according to claim 12.

\* \* \* \* \*